(12) United States Patent
Kimura et al.

(10) Patent No.: US 7,547,734 B2
(45) Date of Patent: Jun. 16, 2009

(54) METHOD FOR PRODUCING RECYCLED RESIN, AND RESIN MATERIAL CONTAINING RECYCLED RESIN PRODUCED BY THAT METHOD

(75) Inventors: Koichi Kimura, Kawasaki (JP); Takamitsu Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 518 days.

(21) Appl. No.: 11/221,970

(22) Filed: Sep. 9, 2005

(65) Prior Publication Data

US 2006/0004113 A1   Jan. 5, 2006

Related U.S. Application Data

(63) Continuation of application No. PCT/JP03/02880, filed on Mar. 11, 2003.

(51) Int. Cl.
*C08J 11/04* (2006.01)

(52) U.S. Cl. .......................... 521/40; 521/40.5; 521/41; 521/41.5; 521/42; 521/42.5; 521/43; 521/43.5; 521/44; 521/44.5; 521/45; 521/45.5; 521/46; 521/46.5; 521/47; 521/47.5; 521/48; 521/48.5; 521/49; 521/49.5; 521/49.8

(58) Field of Classification Search ........... 521/40–49.8
See application file for complete search history.

(56) References Cited

U.S. PATENT DOCUMENTS

| | | | |
|---|---|---|---|
| 6,864,294 B2 * | 3/2005 | Koike et al. | 521/40 |
| 6,958,127 B1 * | 10/2005 | Suzuki et al. | 264/40.1 |
| 2003/0199596 A1 | 10/2003 | Koike et al. | |

FOREIGN PATENT DOCUMENTS

| | | |
|---|---|---|
| JP | 2000-198116 | 7/2000 |
| JP | 2001-30248 | 2/2001 |
| JP | 2001-30251 | 2/2001 |
| JP | 2001-50910 | 2/2001 |
| JP | 2002-59082 | 2/2002 |
| JP | 2003-1632 | 1/2003 |
| JP | 2003-11124 | 1/2003 |

* cited by examiner

*Primary Examiner*—Edward J Cain
(74) *Attorney, Agent, or Firm*—Fujitsu Patent Center

(57) ABSTRACT

Recycled resin is produced by a method including a dismantling/recovery step of dismantling products containing resin moldings and recovering the resin moldings, a removal step of removing unwanted matter including metal components from the resin moldings, a sorting step of discriminating the materials of the resin moldings, and a crushing step of crushing the resin moldings. The method further includes, prior to the crushing step, detecting the metal components, and, after the crushing step, separating out and thus removing metal remaining in crushed material.

9 Claims, 6 Drawing Sheets

FIG. 4

| COMPOSITION | EXAMPLES | | | COMPARATIVE EXAMPLES | |
|---|---|---|---|---|---|
| | RESIN MATERIAL 1 | RESIN MATERIAL 2 | RESIN MATERIAL 3 | RESIN MATERIAL 4 | RESIN MATERIAL 5 |
| | CRUSHED MATERIAL A 20wt%<br>VIRGIN MATERIAL 80wt% | CRUSHED MATERIAL A 20wt%<br>VIRGIN MATERIAL 35wt%<br>PC RESIN 35wt%<br>FIRE RETARDANT 10wt% | CRUSHED MATERIAL A 20wt%<br>VIRGIN MATERIAL 35wt%<br>PC RESIN 30wt%<br>FIRE RETARDANT 10wt%<br>GLASS FIBER 10wt% | CRUSHED MATERIAL B 20wt%<br>VIRGIN MATERIAL 80wt% | VIRGIN MATERIAL 100wt% |

FIG. 5

| | EXAMPLES | | | COMPARATIVE EXAMPLES | | STANDARD |
| --- | --- | --- | --- | --- | --- | --- |
| | RESIN MATERIAL 1 | RESIN MATERIAL 2 | RESIN MATERIAL 3 | RESIN MATERIAL 4 | RESIN MATERIAL 5 | |
| FLEXURAL STRENGTH [kgf/cm$^2$] | 830 | 981 | 1020 | 750 | 840 | 800 OR MORE |
| FLEXURAL MODULUS [kgf/cm$^2$] | 296000 | 34200 | 48000 | 24000 | 30000 | 25000 OR MORE |
| IZOD IMPACT STRENGTH [kgf·cm/cm] | 11 | 18 | 35 | 6 | 11 | 8 OR MORE |
| BAR FLOW LENGTH (FLUIDITY) [mm] | 160 | 161 | 160 | 142 | 153 | 150 OR MORE |
| FIRE RESISTANCE [UL94] | HB | V-2 | V-2 | HB | HB | HB OR MORE |
| COLOR DIFFERENCE [ΔE] | 1.2 | 1.8 | 1.8 | 2.4 | 1.1 | 2 OR LESS |
| APPEARANCE | ○ | ○ | ○ | ○ | ○ | ○ |
| COATABILITY | ○ | ○ | ○ | × | ○ | ○ |
| FOREIGN MATTER [PIECES/DISK] 0.2mm OR MORE | 0 | 0 | 0 | 5 | 0 | 0 |
| FOREIGN MATTER [PIECES/DISK] 0.1mm ≦ BUT <0.2mm | 1 | 2 | 2 | 23 | 0.5 | 2 OR LESS |

METHOD FOR PRODUCING RECYCLED RESIN, AND RESIN MATERIAL CONTAINING RECYCLED RESIN PRODUCED BY THAT METHOD

This application is a continuing application, filed under 35 U.S.C. § 111(a), of International Application PCT/JP2003/002880, filed Mar. 11, 2003, incorporated by reference herein.

TECHNICAL FIELD

The present invention relates to a method for producing recycled resin from resin moldings contained in electronic equipment, household electrical appliances and interiors, for example. Furthermore, the present invention relates to a resin material containing recycled resin obtained by this method.

BACKGROUND ART

In recent years, there have been advances in provision of laws relating to resource measures such as the approval of the Law for the Promotion of Effective Utilization of Resources, and there is now active endeavor to grapple with recycling products back into resources, reusing resources and reducing waste. In particular, for household electrical appliance and electronic equipment manufacturers, recovery and recycling of sold products has become an important issue.

For example, with various personal computers, printers, mobile phones and so on, a resin material is often used as a material constituting the casing from the viewpoint of moldability, light weight and so on. In such fields, establishment of recycling technology for resin casings is thus strongly called for.

Examples of recycling technology for resin casings are thermal recycling technology in which resin casings are used as a heat source, and recycling technology for cascade use in which it is possible to not consider the deterioration in material properties of the recycled resin obtained through recycling the resin casings that much. Following is a concrete description of one example of a method for producing recycled resin in recycling technology for cascade use with reference to FIG. 6. First, various recovered personal computers, printers, mobile phones and so on are dismantled, and the resin casings contained therein are sorted and recovered (dismantling/recovery step S1'). Next, unwanted matter, i.e. attachments such as labels and rubber feet, metal components such as screws and springs, and soiling such as dust is removed from the sorted and recovered resin casings (removal step S2'). Next, sorting is carried out (sorting step S3') by discriminating the materials of the resin casings from which the unwanted matter has been removed using material indications displayed on the resin casings (material discrimination step S31'), carrying out discrimination as to whether or not a fire retardant has been added using a fire resistance test (e.g. UL94 combustion test method) (fire resistance testing step S32'), and carrying out discrimination of color differences using the naked eye (color difference discrimination step S33'). Next, the sorted resin casings are crushed using a crusher (crushing step S5'). Through passing through such steps, recycled resin can be obtained from the recovered products (various personal computers etc.).

However, the extent of deterioration of a resin contained in a resin casing varies greatly according to the state of use of the recovered product, and hence with a resin material containing recycled resin obtained using recycling technology as shown in FIG. 6, it has been difficult to stably obtain material properties, attractive appearance and so on to the same level as with a virgin resin material. It has thus been difficult to use a resin material containing recycled resin as a molding material for resin casings (e.g. resin casings that constituted recovered products) required to have high fluidity and high strength.

Art that enables material properties of a resin material containing recycled resin obtained using recycling technology to be obtained to the same level as with a virgin resin material has thus become publicly known as disclosed in Japanese Patent Application Laid-open No. 2000-198116 and Japanese Patent Application Laid-open No. 2001-30248.

However, with the art disclosed in Japanese Patent Application Laid-open No. 2000-198116 and Japanese Patent Application Laid-open No. 2001-30248, sorting of the materials of the resin casings of recovered products is not carried out, and hence in the case that various materials of resin casings of recovered products are present mixed together, it becomes difficult to maintain the material properties of a resin material containing recycled resin obtained using the recycling technology at the same level as with a virgin resin material. Moreover, a metal separation step such as a magnetic sorting step is carried out a plurality of times, but each of these steps is carried out after the crushing step. Consequently, in the crushing step of crushing the resin casings using a crusher, in the case that metal components or the like remain, these metal components will be crushed together with the resin casings, and hence damage to the crusher will be increased. In addition, the amount of metal to be removed after the crushing will be relatively high, and hence the amount of resin removed together with metal due to being attached to the metal may increase, and thus the resin recovery efficiency may drop.

DISCLOSURE OF THE INVENTION

It is thus an object of the present invention to provide a method for producing recycled resin according to which even in the case that various materials of resin casings of recovered products are present mixed together, it is possible to sort by material and obtain material properties and an attractive appearance for each material to the same level as with a virgin resin material, and moreover a drop in the resin recovery efficiency can be suppressed and damage to a crusher in a crushing step can be reduced.

It is another object of the present invention to provide a resin material containing recycled resin produced using such a production method.

A method for producing recycled resin according to a first aspect of the present invention comprises a dismantling/recovery step of dismantling a product containing a resin molding and recovering the resin molding, a removal step of removing unwanted matter including a metal component from the resin molding, a sorting step of discriminating the material of the resin molding, and a crushing step of crushing the resin molding. The method further comprises, as a step before the crushing step, a metal detection step of detecting the metal component, and as a step after the crushing step, a metal separation step of separating out and thus removing metal remaining in crushed material obtained in the crushing step from the crushed material.

According to this method, even if the resin moldings recovered from the products comprise various materials, the resin moldings can be sorted by material in the sorting step. By carrying out production of recycled resin for each of the sorted materials, the material properties of the recycled resin obtained can thus be made stable. Moreover, due to removing metal through the metal detection step, a drop in the impact strength due to metal being present mixed within the recycled resin produced and discontinuous phases being formed at the places where metal is present can be suppressed, and in addition the occurrence of a defective external appearance can be suppressed. Consequently, even in the case that various materials of resin moldings of products are present mixed together, the material properties of a resin material containing recycled resin produced using the method of the present invention can be maintained at the same level as with a virgin resin material.

Due to providing the metal detection step before the crushing step, the probability of metal components and so on remaining in the resin moldings to be crushed in the crushing step is reduced. Consequently, even in the case, for example, of carrying out the crushing of the resin moldings using a crusher having a blade part, fragments will be less prone to coming off the blade part. Damage to the crusher can thus be reduced. In addition, the amount of metal to be removed in the metal separation step will be reduced, and hence the amount of resin removed together with metal due to being attached to the metal will be reduced. A drop in the resin recovery efficiency can thus be suppressed.

Preferably, the sorting step further includes a fire resistance testing step of measuring the fire resistance of the resin moldings. By including such as step, it can be discriminated whether or not a fire retardant is contained in the resin moldings. If a fire retardant is contained in a resin molding, then problems such as the following may arise in the production of the recycled resin. For example, in the case that a phosphor-type fire retardant is contained, deterioration of material properties such as the fluidity of the recycled resin becoming higher than necessary may arise, and in the case that a halogen-type fire retardant is contained, the recycled resin will be undesirable from an environmental viewpoint. By discriminating the presence/absence of a fire retardant and sorting out and eliminating resin moldings containing a fire retardant in the fire resistance testing step, the material properties of the recycled resin produced can thus be made stable and be more environmentally friendly.

Preferably, the sorting step further includes a color difference measurement step of measuring the color differences of the resin moldings. By including such as step, the hue of the recycled resin can be controlled. As a result, for example, recycled resin having a hue close to white which has great versatility, or recycled resin having a hue close to the hue of virgin resin, can be selectively produced. The same level as with a virgin resin material can thus be maintained in terms of the hue.

Furthermore, the method for producing recycled resin may further include a crushed material separation step of separating out the crushed material that has passed through the metal separation step using a sieve having a mesh size of 1 to 5 mm. By providing such a step, crushed material having a particle size of 1 to 5 mm or less can be sorted out and removed. By sorting out and removing crushed material having a particle size of 1 to 5 mm or less, the size distribution of the crushed material can be narrowed. When kneading the crushed material, the kneading can thus be carried out more uniformly. Moreover, fine foreign matter that could not be completely removed in the removal step or the metal separation step can be removed, and hence recycled resin with more stable material properties can be produced.

Preferably, the detection of metal components in the metal detection step is carried out using a metal detector. As a result, the detection of metal components can be carried out more reliably than with visual observation, and hence the probability of metal components remaining can be reduced more thoroughly.

Preferably, the metal separation step is carried out by magnetic separation using magnetism. Due to providing the metal separation step, contamination of the recycled resin with metal can be suppressed. A drop in the impact strength due to metal being present mixed within the recycled resin and discontinuous phases being formed at the places where the metal is present can thus be suppressed. Moreover, by removing metal thoroughly, the occurrence of a defective external appearance can be suppressed. The magnetic separation is preferably carried out using a magnet having magnetism with a magnetic pole part residual flux density of at least 10000 gauss.

According to a second aspect of the present invention, there is provided a resin material containing virgin resin, and recycled resin produced by a production method as described above.

Preferably, the resin material further contains a fire retardant and/or a filler selected from the group consisting of glass fibers, carbon fibers, glass flakes, glass beads, mica, talc and rubber. As a result, material properties such as the expansion coefficient and the strength of the resin material can be adjusted.

BRIEF DESCRIPTION OF THE DRAWINGS

FIG. 4 is a table showing the compositions of resin materials produced in examples of the present invention and comparative examples.

FIG. 5 is a table showing collectively material properties of and evaluation results for the resin materials produced in the examples of the present invention and the comparative examples.

BEST MODE FOR CARRYING OUT THE INVENTION

Following is a concrete description of a method for producing recycled resin according to an embodiment of the present invention with reference to FIGS. 1 to 5.

Figure 1:
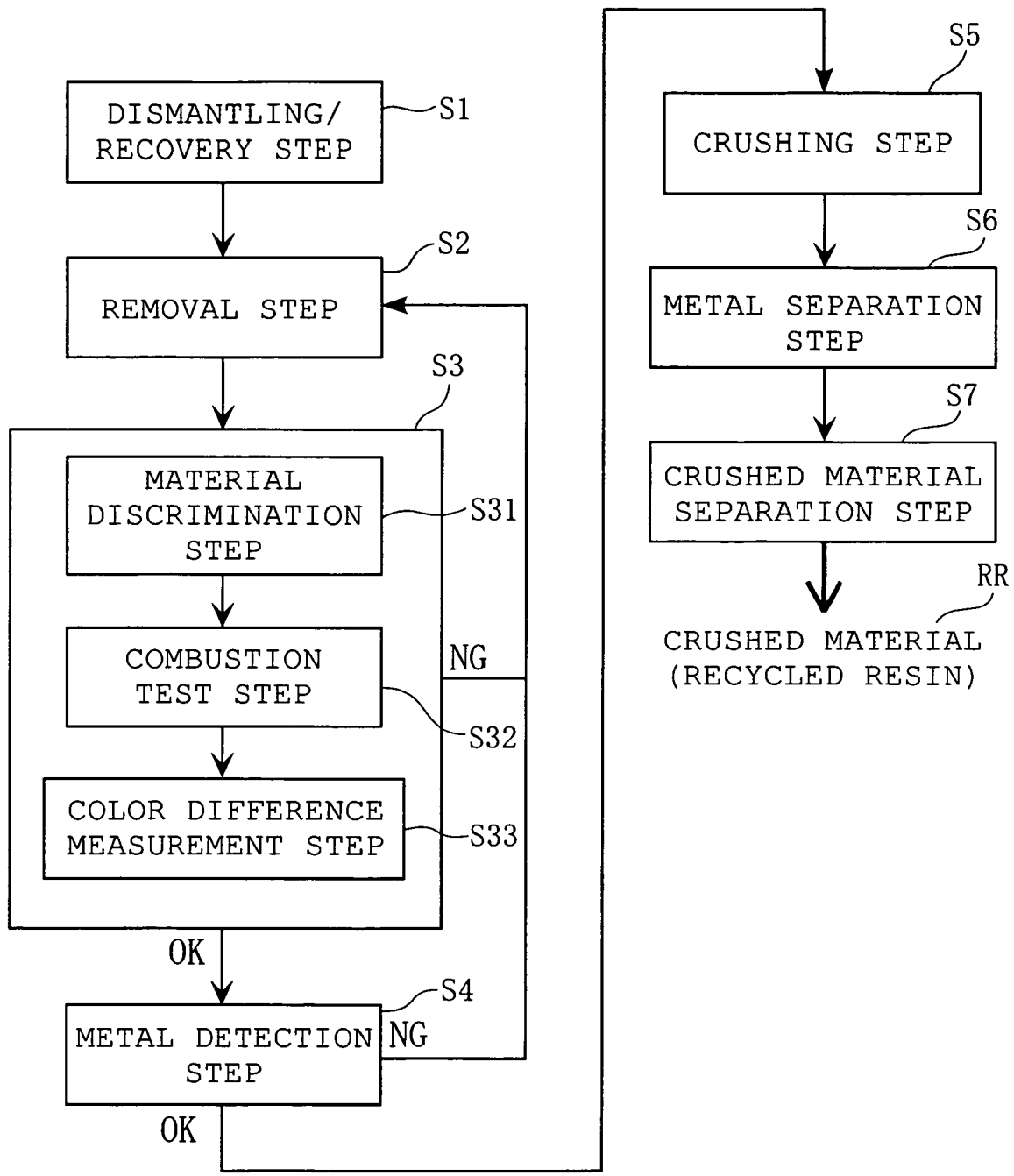
FIG. 1 is a flowchart showing a recycled resin production process according to an embodiment of the present invention.
Figure 2:
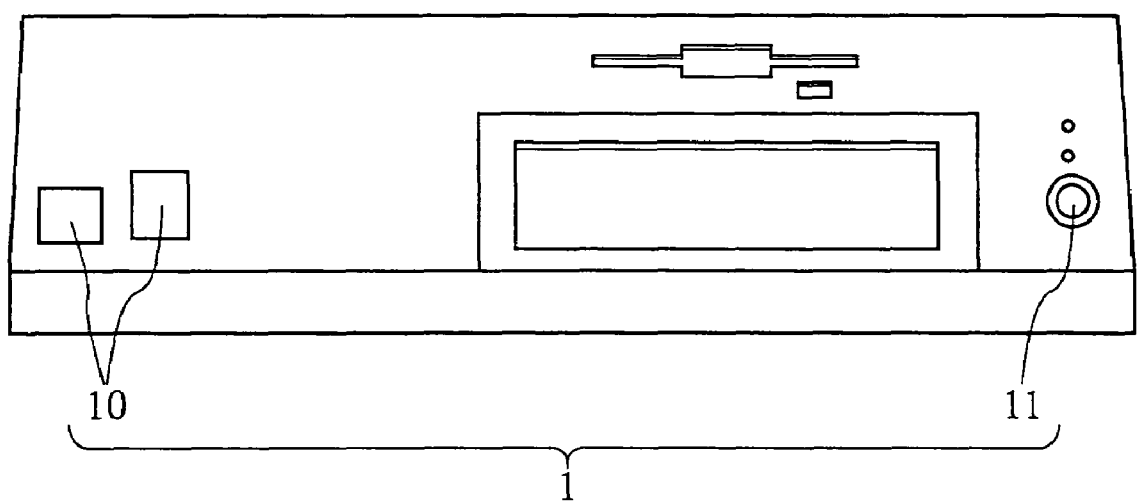
FIG. 2 is a drawing showing an example of a resin molding dismantled and recovered in a dismantling/recovery step.

FIG. 1 is a flowchart showing a series of steps from dismantling and recovery of recovered products (e.g. various personal computers, printers etc.) to production of the recycled resin. Through passing through these steps, a resin material of prescribed material properties can be produced by recycling from various recovered products. FIG. 2 is a drawing showing an example of a resin molding (part of the casing of a desktop personal computer) dismantled and recovered from a recovered product.

In a dismantling/recovery step S1, recovered products having resin moldings therein are dismantled, thus recovering the resin moldings from the recovered products (see FIG. 2). Examples of the recovered products are ones having resin moldings therein such as various personal computers and peripherals thereof (printers, keyboards, displays etc.), electronic equipment such as copiers, household electrical appliances, and interiors. Examples of materials of the resin moldings include resins such as acrylonitrile-butadiene-styrene (ABS) resins, polycarbonate (PC) resins, polyphenylether (PPE) resins, polyamide (PA) resins, liquid crystal polymer (LCP) resins, polylactide (PLA) resins, polyethylene terephthalate (PET) resins, polyphenylene sulfide (PPS) resins, polyacetal (POM) resins and polystyrene (PS) resins, and resin alloys containing such resins.

Figure 3:
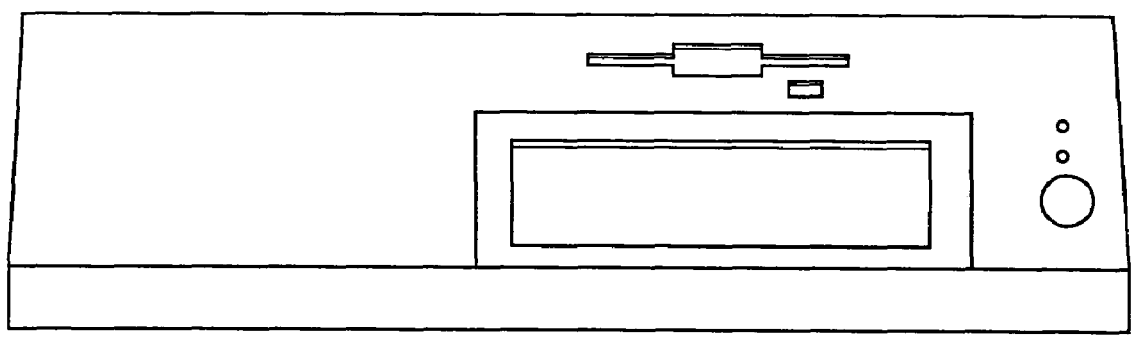
FIG. 3 is a drawing showing an example of the resin molding after passing through a removal step.

In a removal step S2, unwanted matter 1 remaining on the resin moldings recovered through the dismantling/recovery step S1 (see FIG. 2) is removed as shown in FIG. 3. Examples of unwanted matter are attachments 10 such as labels and rubber feet, metal components 11 such as screws and embedded bosses, and soiling such as dust.

The following are examples of specific methods of removing the unwanted matter 1. In the case of an attachment 10, the attachment 10 is scraped off using a spatula or the like, or shaved off using a grinding machine such as a grinder. In the case of a metal component 11, a screw or spring can be taken out manually; considering operational efficiency, an embedded boss or the like is cut out together with the surrounding resin part. In the case of soiling, this is blown off using an air gun, and that which cannot be removed with an air gun is wiped off with a cloth or the like. In the case that soiling that cannot be blown off with an air gun nor completely wiped off with a cloth or the like (e.g. highly adhesive grease etc.) remains on a resin molding, it is preferable to exclude this resin molding from the production process, and for example carry out thermal recycling (melting the resin and separating off the soiling) or the like.

A sorting step S3 includes a material discrimination step S31, a combustion test step S32, and a color difference measurement step 33; in the sorting step S3, the resin moldings are sorted according to material, presence/absence of a fire retardant, and hue. Moreover, in parallel with the sorting, a check is also carried out by visual observation or the like into whether or not unwanted matter 1 remains on the resin moldings, and in the case that unwanted matter 1 is found to remain (NG), the resin molding is fed back into the removal step S2. On the other hand, in the case that no unwanted matter 1 is found to remain (OK), the resin molding is passed on to the next step.

In the material discrimination step S31, discrimination of the materials of the resin moldings is carried out. An example of the discrimination method is a method in which broad classification is carried out according to material indications marked on the resin moldings, and then the resin moldings are put into a material classifier to discriminate the materials more precisely and reliably. In the case of using such a method, the resin moldings can be sorted by material (e.g. ABS resin, PC resin etc.) more reliably. The material properties of the recycled resin can thus be made stable even in the case of producing resin by recycling from resin moldings containing a mixture of various materials.

In the combustion test step S32, discrimination as to whether or not the resin moldings contain a fire retardant is carried out. An example of the discrimination method is a method in which the presence/absence of a fire retardant is verified from an indication marked on each resin molding and classification is carried out, and then a test-piece is cut out from each of resin moldings on which there is no indication of the presence/absence of a fire retardant and resin moldings on which there is an indication that a fire retardant is not contained, and a fire resistance test is carried out on the test-pieces using the UL94 combustion test method or the like. If recycled resin is produced using resin moldings containing a fire retardant, then in the case that the fire retardant is a phosphor-type fire retardant, a deterioration in material properties such as a drop in the molecular weight of the recycled resin may be brought about. Moreover, in the case that the fire retardant is a halogen-type fire retardant, it is undesirable for this to get into the recycled resin from an environmental viewpoint. Resin moldings that are found to contain a fire retardant in the combustion test step S32 are thus preferably excluded from the production process according to the present invention. Note, however, that in the case that it is planned to add a fire retardant when producing a resin material containing recycled resin produced using the production method according to the present invention, it is not necessary to exclude resin moldings containing a fire retardant in the combustion test step S32.

In the color difference measurement step S3, the color difference ($\Delta E$) of each resin molding relative to a color difference standard is measured, thus discriminating the hue of the resin molding. An example of the discrimination method is a method in which the color difference with the hue of the resin molding is measured taking white as the color difference standard using a color difference meter, and sorting is carried out in accordance with the color difference ($\Delta E$) obtained. In general, the closer the hue to white (e.g. $\Delta E \leq 2$), the broader the scope for subsequent coloring and hence the greater the versatility, and hence it is preferable to sort into resin moldings having $\Delta E$ of not more than 2 and resin moldings having $\Delta E$ of more than 2 with white as the color difference standard, and then process these separately. Note that the color difference ($\Delta E$) is a value that indicates quantitatively the extent of the discrepancy in the color from the color used as the color difference standard (e.g. white); the greater the value, the greater the color discrepancy.

In a metal detection step S4, it is detected whether or not metal components such as screws remain in the resin moldings. An example of the detection method is a method in which it is investigated whether or not metal components remain in the resin moldings using a metal detector. Through this method, the detection of metal components can be carried out more reliably than with visual observation, and hence the probability of metal components remaining can be reduced more thoroughly. In the case that metal components are found to remain in a resin molding (NG), the resin molding is fed back into the removal step S2, whereas in the case that no metal components are found to remain (OK), the resin molding is passed on to the next step.

In a crushing step S5, resin moldings for which no metal components were detected in the metal detection step S4 are crushed, thus obtaining a crushed material RR. An example of the crushing method is a method in which crushing is carried out using a crusher having a cover mesh with a prescribed mesh size until the particle size of the resin moldings is less than the mesh size. The mesh size is preferably made to be 8 to 10 mm. In the case that the mesh size is less than 8 mm, there will be much fine powder (e.g. of particle size less than 5 mm), and hence the amount of the crushed material RR removed in a crushed material separation step S7 described below will increase, and thus the recycling efficiency will drop. Moreover, in the case that the mesh size is greater than 10 mm, the particles of the crushed material RR will be too large, and hence problems such as clogging will become prone to occur in the subsequent processing, and moreover it may become difficult to carry out kneading of the crushed material RR to uniformity.

In a metal separation step S6, metal powder present mixed within the crushed material RR is separated out and thus removed. An example of the separation/removal method is a method in which the metal powder is separated out and thus removed by magnetic separation using magnetism. Through this method, even in the case, for example, that contamination with metal powder occurs in the crushing step S5, this metal powder is removed in the metal separation step S6, and hence contamination of the recycled resin with metal powder can be suppressed. A drop in the impact strength due to metal being present mixed within the recycled resin and discontinuous phases being formed at the places where metal is present can thus be suppressed. Moreover, metal powder of particle size such as to be visible (e.g. diameter down to 0.2 mm) can be removed thoroughly, and hence the occurrence of a defective external appearance can be suppressed. The magnetic separation is preferably carried out using a magnet having magnetism with a magnetic pole part residual flux density of at least 10000 gauss.

In the crushed material separation step S7, separating out and removal of fine crushed material RR is carried out. An example of the separation/removal method is a method in which crushed material RR of particle size 1 to 5 mm or less is separated out and thus removed using a sieve having a mesh size of 1 to 5 mm. Through this method, foreign matter (metal powder etc.) that could not be completely removed in the removal step S2 or the metal separation step S6 can be separated out and thus removed together with the fine crushed material RR, and moreover the size distribution of the crushed recycled resin can be narrowed. Recycled resin having more stable material properties can thus be obtained, and moreover because the size distribution of the recycled resin can be narrowed, it becomes possible to carry out kneading of the recycled resin in a more balanced way (due to the size distribution of the recycled resin being narrow), and hence it becomes easy to obtain more uniform resin.

In this way, recycled resin is produced from resin moldings obtained by dismantling recovered products. Moreover, by kneading the recycled resin and virgin material together, a resin material having material properties on a par with resin comprising only virgin material can be obtained. Furthermore, by adding a fire retardant and/or a filler selected from the group consisting of glass fibers, carbon fibers, glass flakes, glass beads, mica, talc and rubber, a resin material having material properties better than the material properties of a resin material comprising only virgin material can be obtained even though the recycled resin is added. Note that specific embodiments of the present invention have been described above, but the present invention is not limited to these; various modifications can be made so long as this is within a scope such as to not deviate from the idea of the present invention.

Next, specific examples of the present invention will be described together with comparative examples.

EXAMPLES

<Production of Recycled Resin>

In the present examples, production of recycled resin having ABS resin as a principal component thereof was carried out from recovered products (desktop personal computers, printers etc.) containing a mixture of resin casings each having an ABS resin, a PC resin or a PS resin as a material thereof following the procedure shown in FIG. 1.

(Dismantling/Recovery Step)

The recovered products were dismantled, and the resin casings were recovered.

(Removal Step)

Unwanted matter remaining on the resin casings recovered in the dismantling/recovery step was removed. Specifically, labels and rubber feet were scraped off with a spatula, screws and springs were taken out, and embedded bosses were cut out together with the surrounding resin part. Moreover, dust attached to the resin casings was blown off using an air gun, and soiling that could not be blown off was wiped off with a cloth. Resin casings on which soiling that could not be wiped off remained were eliminated from the recycled resin production process.

(Material Discrimination Step)

First, with regard to material indications marked on the resin casings, resin casings having 'ABS resin' indicated as the material were extracted and kept. Next, resin casings having no material indication and the resin casings having an 'ABS resin' indication were subjected to discrimination/verification of the material using a material classifier (trade name: PLID-3, made by Toa Denpa Kogyo Co., Ltd.). Moreover, resin casings that were found to have unwanted matter remaining thereon in this step were fed back into the removal step.

(Combustion Test Step)

First, resin casings for which it was discriminated that the material was an ABS resin through the material discrimination step (hereinafter referred to as 'ABS resin casings') and for which there was an indication showing that the resin casing had a fire retardant added thereto were eliminated from the recycled resin production process. Next, a combustion test was carried out using the UL94 combustion test method on test-pieces cut out from ABS resin casings for which there was no indication with regard to the addition of a fire retardant, thus discriminating the fire resistance. Sorting was then carried out into ABS resin casings for which the fire resistance was HB (UL94 standards) (hereinafter referred to as 'ABS resin casings (HB)') and ABS resin casings for which the fire resistance was at least V-2 (UL94 standards) (hereinafter referred to as 'ABS resin casings ($\leqq$V-2)'), and the ABS resin casings ($\leqq$V-2) were eliminated from the recycled resin production process as resin casings having a fire retardant added thereto. Moreover, resin casings that were found to have unwanted matter remaining thereon in this step were fed back into the removal step.

(Color Difference Measurement Step)

The ABS resin casings (HB) were subjected to measurement of the color difference ($\Delta E$) with the hue of the ABS resin casing (HB) taking white as a color difference standard using a color difference meter (trade name: CM-2600d, made by Minolta). Sorting was then carried out into ABS resin casings (HB) having $\Delta E$ of more than 2 and ABS resin casings (HB) having $\Delta E$ of not more than 2, and the ABS resin casings (HB) having $\Delta E$ of not more than 2 were extracted and kept. Moreover, resin casings that were found to have unwanted matter remaining thereon in this step were fed back into the removal step.

(Metal Detection Step)

For the ABS resin casings (HB) having $\Delta E$ of not more than 2 that had passed through the sorting step comprising the material discrimination step, the combustion test step and the color difference measurement step, the presence/absence of metal components (screws, springs, embedded bosses etc.) remaining in the ABS resin casings (HB) was investigated using a desktop metal detector (trade name: MS-3114-35S, made by Nissin Electronics Co., Ltd.). Resin casings for which metal components were found to remain were then fed back into the removal step.

(Crushing Step)

ABS resin casings for which no metal components were found to remain in the metal detection step were crushed using a crusher (screen mesh size: 8 mm).

(Metal Separation Step)

The material obtained by crushing the ABS resin casings in the crushing step (hereinafter referred to as the 'crushed material') was passed into an installation part of magnetic bars (2-tier 5-bar type, made by Yamasan Co., Ltd.) having a magnetic pole part residual flux density of 12000 gauss, thus separating out and hence removing metal powder present mixed within the crushed material.

(Crushed Material Separation Step)

Using a sieve having a 5 mm mesh, crushed material of particle size not more than 5 mm was separated out and hence removed from the crushed material that had passed through the metal separation step.

In this way, recycled resin having ABS resin as a principal component thereof was produced as a crushed material A having a particle size of 5 to 8 mm.

<Investigation into Residual Unwanted Matter>

It was investigated whether or not unwanted matter was present mixed within the crushed material A produced as described above. First, an investigation into unwanted matter other than metal was carried out by visual observation, but such unwanted matter was not found. Next, an investigation into metallic unwanted matter was carried out by passing the crushed material A into a grid of magnets comprising two tiers on top of one another, but such unwanted matter was not found.

<Investigation into Contamination with Other Material>

First, using the crushed material A produced as described above, a disk (diameter 15 mm, thickness 0.5 mm) was produced using a hot press, and the hue of the disk was investigated. The result was that, broadly classifying, a color distribution with a total of four colors, i.e. ivory, light gray, gray and dark gray, was found on the disk. Note that it is thought that the grayish colors were due to soiling and baking during the stage of producing the disk. Next, samples from parts exhibiting each of the above colors were taken, and the components of the samples were analyzed using an FT-IR analyzer (trade name: Spectrum, made by PerkinElmer, Inc.). The result was that the sample of each color was ABS resin.

<Investigation into Pellet Production Ability>

The state of extrusion was investigated when pelletizing the crushed material A produced as described above using a twin screw extruder/kneader having an agitating blade (trade name: KZW-15, made by Technovel Corporation). The result was that when the crushed material A was used, surging did not occur, and pellets could be produced with a very stable state. It is thought that this is due to there being little variation in the particle size of the crushed material A (5 to 8 mm). Note that 'surging' refers to a phenomenon in which, when kneading the crushed material while heating, the agitating blade stops due to biting because the crushed material has a large particle size, or conversely the agitating blade runs idle because the crushed material has a small particle size, whereby the rotation of the agitating blade becomes uneven.

<Production of Resin Materials>

Using the crushed material A produced as described above, three types of resin materials (resin material 1 to resin material 3) were produced as molding materials. Resin material 1 comprised a mixture of 20 wt % of the crushed material A, and 80 wt % of an ABS resin (trade name: VD200, made by UMG ABS, Ltd.) as virgin material. Resin material 2 comprised a mixture of 20 wt % of the crushed material A, 35 wt % of an ABS resin (trade name: VD200, made by UMG ABS, Ltd.) as virgin material, 35 wt % of a PC resin (trade name A1900, made by Idemitsu Kosan Co., Ltd.), and 10 wt % of a phosphor-type fire retardant (trade name ADK Stab, made by Asahi Denka Co., Ltd.). Resin material 3 comprised a mixture of 20 wt % of the crushed material A, 30 wt % of an ABS resin (trade name: VD200, made by UMG ABS, Ltd.) as virgin material, 30 wt % of a PC resin (trade name A1900, made by Idemitsu Kosan Co., Ltd.), 10 wt % of a phosphor-type fire retardant (trade name ADK Stab, made by Asahi Denka Co., Ltd.), and 10 wt % of glass fibers (trade name: CS 03 MA FT737, made by Asahi Fiber Glass Co.). The compositions of the materials are shown in FIG. 4. Next, each of the resin materials 1 to 3 was melt-kneaded at approximately 230° C. using a twin screw extruder/kneader (trade name: KZW-15, made by Technovel Corporation). Each of the melt-kneaded resin materials 1 to 3 was further pelletized using a strand cut pelletizer (trade name: SCP-102, made by Technovel Corporation)

<Production of Resin Moldings>

Molding samples 1 to 3 (each of length 126 mm, width 12.8 mm, and thickness 3.2 mm) were molded using an injection molding machine (trade name: SG50, made by Sumitomo Heavy Industries, Ltd.) from the pellets of the resin materials 1 to 3 obtained as described above.

<Measurement of Flexural Strength>

The flexural strength was measured for the molding samples 1 to 3 produced as described above. Specifically, a three-point bending test was carried out for each of the molding samples 1 to 3 in accordance with JIS K 7055 using a universal testing machine (trade name: Instron 5581, made by Instron Japan). The distance between the two supporting points (the span) was made to be 51.2 mm, and the flexural strength of each molding sample was measured by applying a pushing force to the approximate center between the two supporting points. The results were that the molding sample 1 exhibited a flexural strength of 830 kgf/cm$^2$, the molding sample 2 exhibited a flexural strength of 981 kgf/cm$^2$, and the molding sample 3 exhibited a flexural strength of 1020 kgf/cm$^2$. These results are shown in FIG. 5. It is desirable for the flexural strength as a resin material to be at least 800 kgf/cm$^2$.

<Measurement of Flexural Modulus>

The flexural modulus was measured for the molding samples 1 to 3 produced as described above. Specifically, a flexural modulus test was carried out for each of the molding samples 1 to 3 in accordance with JIS K 7055 using a universal testing machine (trade name: Instron 5581, made by Instron Japan) . The distance between the two supporting points (the span) was made to be 51.2 mm, and the flexural modulus of each molding sample was measured by applying a pushing force to the approximate center between the two supporting points. The results were that the molding sample 1 exhibited a flexural modulus of 29600 kgf/cm$^2$, the molding sample 2 exhibited a flexural modulus of 34200 kgf/cm$^2$, and the molding sample 3 exhibited a flexural modulus of 48000 kgf/cm$^2$. These results are shown in FIG. 5. It is desirable for the flexural modulus as a resin material to be at least 25000 kgf/cm$^2$.

<Izod Impact Test>

Izod impact test test-pieces 1 to 3 (each of length 126 mm, width 12.8 mm, and thickness 3.2 mm, with a notch having a depth of 2.54 mm in the thickness direction) for an Izod impact test in accordance with JIS K 7110 were molded using an injection molding machine (trade name: SG50, made by Sumitomo Heavy Industries, Ltd.) from the pellets of the resin materials 1 to 3 obtained as described above, and the impact resistance was investigated for the Izod impact test test-pieces 1 to 3. Specifically, an Izod impact test was carried out in accordance with JIS K 7110 using an Izod impact testing machine (trade name: Impact Tester, made by Toyo Seiki Seisaku-Sho Ltd.). The Izod impact value in a flatwise impact was 11 kgfcm/cm for the Izod impact test test-piece 1, 18 kgfcm/cm for the Izod impact test test-piece 2, and 35 kgfcm/cm for the Izod impact test test-piece 3. These results are shown in FIG. 5. It is desirable for the Izod impact strength as a resin material to be at least 8 kgfcm/cm.

<Evaluation of Fluidity>

The flow length was measured in the case of injection molding at an injection pressure of 1600 kgf/cm$^2$ molten resin materials 1 to 3 obtained by melting at 220° C. the pellets of the resin materials 1 to 3 obtained as described above, this being using a bar flow mold that stipulates a cavity (total length of flow path: 1650 mm, width of flow path: 10 mm, thickness of flow path: 1 mm, mold temperature: 120° C.). The results were that the molten resin material 1 exhibited a flow length of 160 mm, the molten resin material 2 exhibited a flow length of 161 mm, and the molten resin material 3 exhibited a flow length of 161 mm. These results are shown in FIG. 5. It is desirable for the flow length as a resin material to be at least 150 mm.

<Evaluation of Fire Resistance>

Combustion test test-pieces 1 to 3 (125 mm×13 mm×1 mm) were produced using an injection molding machine (trade name: SG50, made by Sumitomo Heavy Industries, Ltd.) from the pellets of the resin materials 1 to 3 obtained as described above, and a combustion test was carried out. Specifically, a combustion test was carried out using a method in accordance with the UL94 vertical combustion test method by making an approximately 2.5 cm burner flame contact each test-piece in a UL combustion test chamber (trade name: HVUL, made by Toyo Seiki Seisaku-Sho Ltd.), and the fire resistance was evaluated. The results are shown in FIG. 5.

<Measurement of Color Difference>

The molding samples 1 to 3 produced as described above were subjected to measurement of the color difference (ΔE) with the hue of the molding sample 1 to 3 taking white as a color difference standard using a color difference meter (trade name: CM-2600d, made by Minolta). The results were that the molding sample 1 exhibited a color difference of 1.2, the molding sample 2 exhibited a color difference of 1.8, and the molding sample 3 exhibited a color difference of 1.8. These results are shown in FIG. 5. It is desirable for the color difference as a resin material to be not more than 2.

<Evaluation of External Appearance>

The external appearance of the molding samples 1 to 3 produced as described above was observed, and the quality (good: O, bad: x) of the external appearance of each molding sample was evaluated from the extent of occurrence of sink marks, burrs and so on. The results are shown in FIG. 5.

<Evaluation of Coatability>

The molding samples 1 to 3 produced as described above were coated, and the quality (good: O, bad: x) of the coatability of each molding sample was evaluated from the state of the coating in this case. The results are shown in FIG. 5.

<Investigation into Residual Foreign Matter>

Using the resin materials 1 to 3, sample disks 1 to 3 (diameter 15 mm, thickness 0.5 mm) were produced using a hot press, the external appearance of the sample disks 1 to 3 was observed, and the number of pieces of visible foreign matter (which looks black) having a diameter of at least 0.2 mm and the number of pieces of visible foreign matter having a diameter of 0.1 to below 0.2 mm were counted. For sample disk 1, 0 pieces of foreign matter having a diameter of at least 0.2 mm per disk and 1 piece of foreign matter having a diameter of 0.1 to below 0.2 mm per disk were detected. For sample disk 2, 0 pieces of foreign matter having a diameter of at least 0.2 mm per disk and 2 pieces of foreign matter having a diameter of 0.1 to below 0.2 mm per disk were detected. For sample disk 3, 0 pieces of foreign matter having a diameter of at least 0.2 mm per disk and 2 pieces of foreign matter having a diameter of 0.1 to below 0.2 mm per disk were detected. These results are shown in FIG. 5. In the evaluation of foreign matter, it is desirable for there to be no foreign matter having a diameter of at least 0.2 mm (spot-like soiling), and for there to be not more than 2 pieces of foreign matter having a diameter of 0.1 to below 0.2 mm.

COMPARATIVE EXAMPLES

<Production of Recycled Resin>

Figure 6:
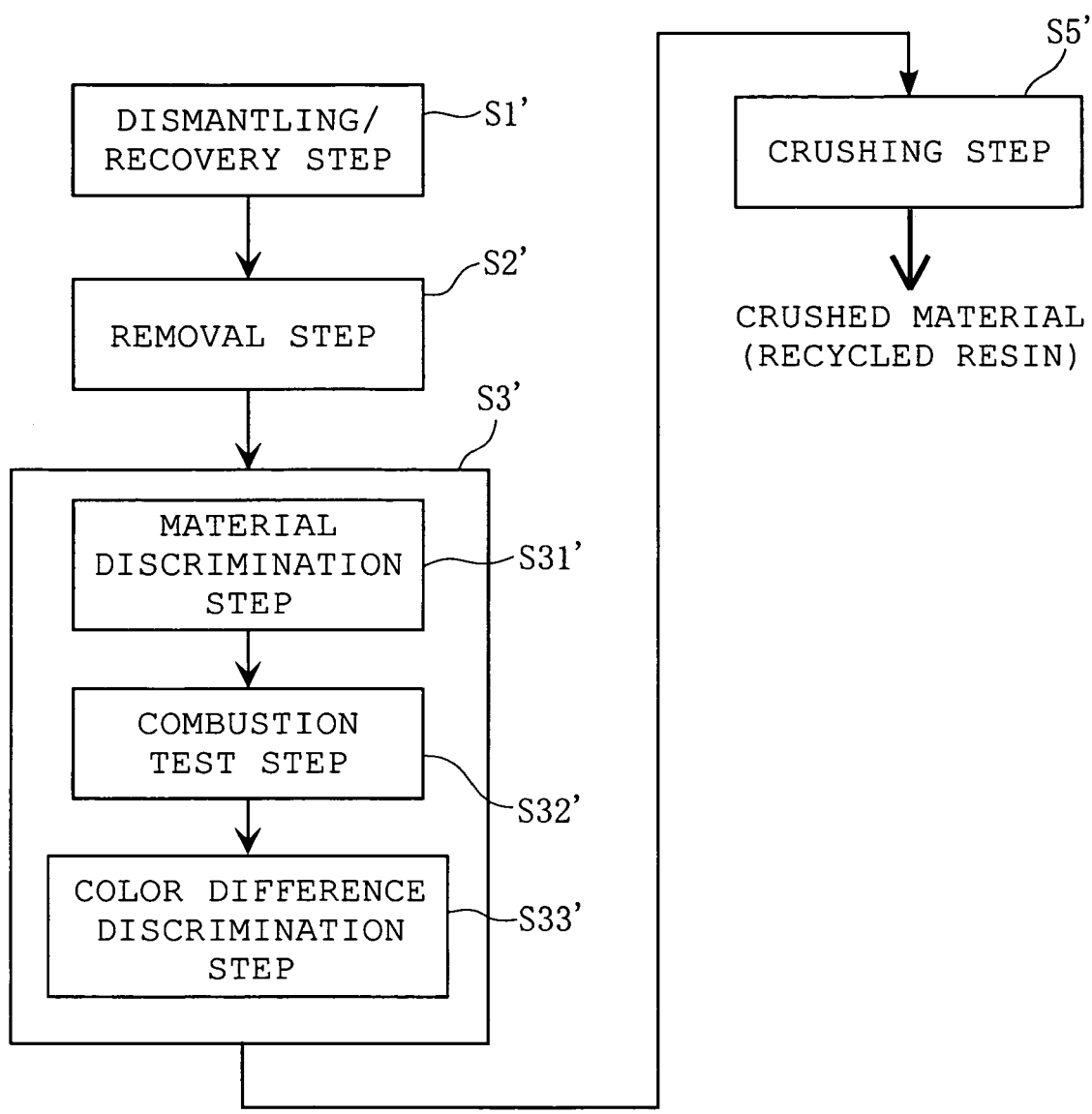
FIG. 6 is a flowchart of a conventional method for producing a recycled resin material.

In the present comparative examples, production of recycled resin having ABS resin as a principal component thereof was carried out from recovered products (desk top personal computers, printers etc.) containing a mixture of resin casings having as materials thereof resins selected from the group consisting of acrylonitrile-butadiene-styrene (ABS) resins, polycarbonate resins and polystyrene resins following the procedure shown in FIG. 6.

(Dismantling/Recovery Step S1')

The recovered products were dismantled, and the resin casings were recovered.

(Removal Step S2')

Unwanted matter remaining on the resin casings recovered in the dismantling/recovery step S1' was removed. Specifically, labels and rubber feet were scraped off with a spatula, screws and springs were taken out, and embedded bosses were cut out together with the surrounding resin part. Moreover, dust attached to the resin casings was blown off using an air gun, and soiling that could not be blown off was wiped off with a cloth. Resin casings on which soiling that could not be wiped off remained were eliminated from the recycled resin production process.

(Material Discrimination Step S31' of S3')

With regard to material indications marked on the resin casings, resin casings having 'ABS resin' indicated as the material were extracted and kept.

(Combustion Test Step S32' of S3')

Discrimination of the fire resistance was carried out as in the examples. Sorting was then carried out into ABS resin casings (HB) and ABS resin casings (≦V−2), and the ABS resin casings (≦V−2) were eliminated from the recycled resin production process as resin casings having a fire retardant added thereto.

(Color Difference Measurement Step S33' of S3')

ABS resin casings (HB) that were judged by the naked eye to be white were extracted and kept.

(Crushing Step S5')

ABS resin casings that had passed through the above color difference measurement step were crushed using a crusher (screen mesh size: 20 mm).

In this way, recycled resin having ABS resin as a principal component thereof was produced as a crushed material B having a particle size of up to 20 mm.

<Investigation into Residual Unwanted Matter>

It was investigated whether or not unwanted matter remained in the crushed material B produced as described above. First, an investigation into unwanted matter other than metal was carried out by visual observation. The result was that attachments such as labels were found to remain. Next, an investigation into metallic unwanted matter was carried out by passing the crushed material into a grid of magnets comprising two tiers on top of one another. The result was that metal thought to originate from embedded bosses was found to remain.

<Investigation into Contamination with Other Material>

First, using the crushed material B produced as described above, a disk (diameter 15 mm, thickness 0.5 mm) was produced using a hot press, and the hue of the disk was investigated. The result was that, broadly classifying, a color distribution with a total of four colors, i.e. ivory, light gray, gray and dark gray, was found on the disk. Note that it is thought that the grayish colors were due to soiling and baking during the stage of producing the disk. Next, samples from parts exhibiting each of the above colors were taken, and the components of the samples were analyzed using an FT-IR analyzer (trade name: Spectrum, made by PerkinElmer, Inc.). The result was that the sample of each color was ABS resin, but high impact polystyrene resin was also detected from the light gray part and dark gray part samples. It is thought that this occurred because contamination with other materials was not sufficiently prevented, for example there were cases in which a material written as the material indication in the material discrimination step was only the principal component.

<Investigation into Pellet Production Ability>

The state of extrusion was investigated when pelletizing the crushed material B produced as described above using a twin screw extruder/kneader having an agitating blade (trade name: KZW-15, made by Technovel Corporation). The result was that in the case of using the crushed material B, clogging occurred with the twin screw extruder/kneader, and hence it was difficult to produce uniform pellets. It is thought that this is due to there being great variation in the particle size of the crushed material (up to 20 mm), and the maximum value (20 mm) of the particle size of the crushed material B being high.

<Production of Resin Materials>

Using the crushed material B produced as described above, a resin material 4 was produced as a molding material; a resin material 5 comprising only virgin material was also produced. Resin material 4 comprised a mixture of 20 wt % of the crushed material B, and 80 wt % of an ABS resin (trade name: VD200, made by UMG ABS, Ltd.) as virgin material. Moreover, resin material 5 comprised 100 wt % of an ABS resin (trade name: VD200, made by UMG ABS, Ltd.) as virgin material. The compositions of the materials are shown in FIG. 4. Next, each of the resin materials 4 and 5 was pelletized as for the examples.

<Production of Resin Moldings>

Molding samples 4 and 5 (each of length 126 mm, width 12.8 mm, and thickness 3.2 mm) were molded using an injection molding machine (trade name: SG50, made by Sumitomo Heavy Industries, Ltd.) from the pellets of the resin materials 4 and 5 obtained as described above.

<Measurement of Flexural Strength>

The flexural strength was measured as for the examples for the molding samples 4 and 5 produced as described above. The results were that the molding sample 4 exhibited a flexural strength of 750 kgf/cm$^2$, and the molding 5 exhibited a flexural strength of 840 kgf/cm$^2$. These results are shown in FIG. 5.

<Measurement of Flexural Modulus>

The flexural modulus was measured as for the examples for the molding samples 4 and 5 produced as described above. The results were that the molding sample 4 exhibited a flexural modulus of 24000 kgf/cm$^2$, and the molding sample 5 exhibited a flexural modulus of 30000 kgf/cm$^2$. These results are shown in FIG. 5.

<Izod Impact Test>

Izod impact test test-pieces 4 and 5 (each of length 126 mm, width 12.8 mm, and thickness 3.2 mm, with a notch having a depth of 2.54 mm in the thickness direction) were molded as for the examples from the pellets of the resin materials 4 and 5 obtained as described above, and the impact resistance was investigated for the Izod impact test test-pieces 4 and 5. The Izod impact value in a flatwise impact was 6 kgfcm/cm for the Izod impact test test-piece 4, and 11 kgfcm/cm for the Izod impact test test-piece 5. These results are shown in FIG. 5.

<Evaluation of Fluidity>

As for the examples, the flow length was measured in the case of injection molding at an injection pressure of 1600 kgf/cm$^2$ molten resin materials 4 and 5 obtained by melting at 220° C. the pellets of the resin materials 4 and 5. The results were that the molten resin material 4 exhibited a flow length of 142 mm, and the molten resin material 5 exhibited a flow length of 153 mm. These results are shown in FIG. 5.

<Evaluation of Fire Resistance>

Combustion test test-pieces 4 and 5 (125 mm×13 mm×1 mm) were produced using an injection molding machine (trade name: SG50, made by Sumitomo Heavy Industries, Ltd.) from the pellets of the resin materials 4 and 5 obtained as described above, a combustion test was carried out, and the fire resistance was evaluated. The results are shown in FIG. 5.

<Measurement of Color Difference>

The molding samples 4 and 5 produced as described above were subjected to measurement of the color difference (ΔE) with the hue of the molding sample 4 or 5 taking white as a color difference standard using a color difference meter (trade name: CM-2600d, made by Minolta) The results were that the molding sample 4 exhibited a color difference of 2.4, and the molding sample 5 exhibited a color difference of 1.1. These results are shown in FIG. 5.

<Evaluation of External Appearance>

The external appearance of the molding samples 4 and 5 produced as described above was observed, and the quality (good: O, bad: x) of the external appearance of each molding sample was evaluated from the extent of occurrence of sink marks, burrs and so on. The results are shown in FIG. 5.

<Evaluation of Coatability>

The molding samples 4 and 5 produced as described above were coated, and the quality (good: O, bad: x) of the coatability of each molding sample was evaluated from the state of the coating in this case. The results are shown in FIG. 5.

<Investigation into Residual Foreign Matter>

Using the resin materials 4 and 5, sample disks 4 and 5 (diameter 15 mm, thickness 0.5 mm) were produced using a hot press, the external appearance of the sample disks 4 and 5 was observed, and the number of pieces of visible foreign matter (which looks black) having a diameter of at least 0.2 mm and the number of pieces of visible foreign matter having a diameter of 0.1 to below 0.2 mm were counted. The results were that for sample disk 4, 5 pieces of foreign matter having a diameter of at least 0.2 mm per disk and 23 pieces of foreign matter having a diameter of 0.1 to below 0.2 mm per disk were detected. For sample disk 5, 0 pieces of foreign matter having a diameter of at least 0.2 mm per disk and 0.5 pieces of foreign matter having a diameter of 0.1 to below 0.2 mm per disk were detected. These results are shown in FIG. 5.

<Evaluation>

As shown in FIG. 5, comparing the material properties of resin material 1 and the material properties of resin material 4, with resin material 4 containing recycled resin obtained using a conventional production method (crushed material B), the material properties fell short off the standard desired for a resin material, whereas with resin material 1 containing recycled resin obtained using the production method according to the present invention (crushed material A), the results were that the material properties all met the prescribed standard. Moreover, compared with the material properties of resin material 5 comprising only virgin material, the material properties of resin material 1 were approximately on a par therewith, and the material properties of both resin material 2 and resin material 3 were both better than those of resin material 5.

The invention claimed is:

1. A method for producing recycled resin comprising:
   dismantling a product containing a resin molding and recovering the resin molding;
   removing unwanted matter including a metal component from the resin molding;
   detecting whether there is any remaining metal component in the resin molding subsequent to the removal of the unwanted matter;
   upon the detection of a remaining metal component in the resin molding, repeating said removing unwanted matter to remove the remaining metal component;
   crushing the resin molding into crushed material; and
   separating and removing metal remaining in the crushed material.

2. The method for producing recycled resin according to claim 1, further comprising:
   discriminating the material of the resin molding by measuring fire resistance of the resin molding.

3. The method for producing recycled resin according to claim 1, further comprising:
   discriminating the material of the resin molding by measuring color difference of the resin molding.

4. The method for producing recycled resin according to claim 1, further comprising separating out the crushed material using a sieve having a mesh size of 1 to 5 mm.

5. The method for producing recycled resin according to claim 1, wherein detecting whether there is any remaining metal component comprises:
   detecting whether there is any remaining metal component with a metal detector.

6. A method for producing recycled resin comprising: a dismantling/recovery step of dismantling a product containing a resin molding and recovering the resin molding; a removal step of removing unwanted matter including a metal component from the resin molding; a sorting step of discriminating a material of the resin molding; and a crushing step of crushing the resin molding;
   wherein the method further comprises a metal detection step, before the crushing step, for detecting the metal component, and a metal separation step, after the crushing step, for separating and removing metal remaining in crushed material obtained in the crushing step; and
   wherein the sorting step further includes a fire resistance testing step of measuring fire resistance of the resign molding.

7. A method for producing recycled resin comprising:
   dismantling a product containing a resin molding and recovering the resin molding;
   removing unwanted matter including a metal component from the resin molding;
   discriminating a material of the resin molding by measuring fire resistance of the resign molding;
   detecting a remaining metal component in the resin molding;
   crushing the resin molding subsequent to the detecting; and
   separating and removing metal remaining in crushed material resulting from the crushed resin molding.

8. The method according to claim 7 wherein discriminating the material of the resin molding further comprises measuring color difference of the resin molding.

9. The method according to claim 7, further comprising:
   separating out the crushed material using a sieve having a mesh size of 1 to 5 mm.

\* \* \* \* \*